(12) United States Patent
Tosey et al.

(10) Patent No.: US 7,624,147 B2
(45) Date of Patent: Nov. 24, 2009

(54) EFFICIENT NOTIFICATION OF NEW ELECTRONIC MAIL ARRIVAL

(75) Inventors: Joseph Peter Robert Tosey, N. Vancouver (CA); Peter R. Henderson McConnell, Vancouver (CA); William Waung, Burnaby (CA)

(73) Assignee: Sierra Wireless, Inc., Richmond, BC (CA)

( * ) Notice: Subject to any disclaimer, the term of this patent is extended or adjusted under 35 U.S.C. 154(b) by 784 days.

(21) Appl. No.: 10/655,679

(22) Filed: Sep. 4, 2003

(65) Prior Publication Data

US 2005/0055443 A1 Mar. 10, 2005

(51) Int. Cl.
*G06F 15/16* (2006.01)

(52) U.S. Cl. .................. 709/206; 709/204; 709/205; 709/207

(58) Field of Classification Search .......... 709/204–207
See application file for complete search history.

(56) References Cited

U.S. PATENT DOCUMENTS

| | | | | |
|---|---|---|---|---|
| 5,483,466 A * | 1/1996 | Kawahara et al. | ........... | 709/203 |
| 5,493,692 A * | 2/1996 | Theimer et al. | ............ | 455/26.1 |
| 6,067,561 A | 5/2000 | Dillon et al. | | |
| 6,237,027 B1 * | 5/2001 | Namekawa | .................. | 709/206 |
| 6,304,896 B1 | 10/2001 | Fujiki et al. | | |
| 6,320,941 B1 * | 11/2001 | Tyroler | ..................... | 379/93.24 |
| 6,396,513 B1 * | 5/2002 | Helfman et al. | ............. | 715/752 |
| 6,400,810 B1 * | 6/2002 | Skladman et al. | ........ | 379/93.24 |
| 6,446,118 B1 | 9/2002 | Gottlieb et al. | | |
| 6,748,450 B1 * | 6/2004 | Dutta | ......................... | 709/246 |
| 6,829,636 B1 * | 12/2004 | Kubik et al. | ................ | 709/206 |
| 6,850,968 B1 * | 2/2005 | Pfeffer et al. | ............... | 709/206 |
| 6,920,483 B1 * | 7/2005 | Cordray et al. | ............. | 709/206 |
| 7,076,529 B2 * | 7/2006 | Koch et al. | .................. | 709/206 |
| 7,082,439 B1 * | 7/2006 | Hickman et al. | ......... | 707/104.1 |
| 7,181,495 B2 * | 2/2007 | Skladman et al. | ........... | 709/206 |
| 7,183,115 B1 * | 2/2007 | Lauglin | ....................... | 436/38 |
| 7,284,045 B1 * | 10/2007 | Marl et al. | ................... | 709/223 |
| 7,490,146 B1 * | 2/2009 | Motoyama et al. | .......... | 709/224 |
| 2002/0026513 A1 * | 2/2002 | Hoglund et al. | ............. | 709/227 |
| 2003/0120775 A1 * | 6/2003 | York | .......................... | 709/224 |
| 2004/0122905 A1 * | 6/2004 | Smith et al. | ................. | 709/206 |

FOREIGN PATENT DOCUMENTS

WO    WO 00197019    12/2001

OTHER PUBLICATIONS

Leiba, IMAP4 IDLE command, Jun. 1997, Network Working Group, RFC 2177.*
M. Crispin; Internet Message Access Protocol—Version 4rev1; Mar. 2003; Network Working Group.*
International Search Report dated Jan. 21, 2005, PCT/CA2004/001589.

* cited by examiner

*Primary Examiner*—Brian P Whipple
(74) *Attorney, Agent, or Firm*—Nixon Peabody LLP

(57) ABSTRACT

A solution is provided that allows prompt notification of new e-mail arrival while minimizing the unnecessary loading of mail server and network resources. It provides a short time delay after arrival of new e-mail when the user needs it most, and minimizes the unnecessary loading of resources when the user does not require immediate notification. This is accomplished by establishing a session with the mail server once a predefined event, such as the sending of new e-mail, has occurred. This session may invoke server-initiated-notification of new-email for a limited period of time.

27 Claims, 5 Drawing Sheets

EFFICIENT NOTIFICATION OF NEW ELECTRONIC MAIL ARRIVAL

FIELD OF THE INVENTION

The present invention relates to the field of electronic mail (e-mail). More particularly, the present invention relates to the efficient notification of new electronic mail arrival to electronic mail client by an electronic mail server.

BACKGROUND OF THE INVENTION

Typical electronic mail (e-mail) systems utilize a mail server, typically controlled by the ISP or other manager of email service, as well as a mail client located on each user's machine. The mail server typically has permanent access to the Internet, as well as other external networks and public data communications networks. The mail server stores and manages user electronic mails. Mail for each authorized user on the system is maintained within an individual storage architecture, commonly known as an inbox. FIG. 1 is a block diagram illustrating this type of design. The mail server 100 stores incoming emails, and then is periodically polled by one or more mail clients 102 on client machines.

Mail received at the mail server is typically processed based on a recipient address identified within the electronic mail. Once the recipient is known, the mail server assigns a unique identifier to the piece of electronic mail, which is common in, for example, the IMAP4 standard. This identifier is unique among each mail user's inbox, such that each message in the inbox has a different identifier. These unique identifiers are typically assigned according to known algorithms. In this way, the mail server is able to provide electronic mail storage and management for a large population of authorized electronic mail clients.

Each user then may utilize a mail client to retrieve electronic mail from the mail server. The mail client may have only periodic access to the Internet, or other external networks and public data communications networks. The mail client may maintain local copies of selected electronic mails corresponding to the user. The mail client accesses the server to retrieve mail from the inbox. This is accomplished by providing authorization credentials to the authorized mail box. This may be repeated periodically to allow the mail client to download and/or copy newly received electronic mails into local storage. This is typically known as "polling".

Typically, polling involves the mail client requesting a full listing of all the email header information. This full listing of all headers is then compared to the local storage record of the client. If there are any discrepancies, the client may then initiate data transfer(s) to synchronize the mail client's record with the mail server's record. This may include downloading new mail items that exist on the mail server but not on the mail client, as well as deleting old mail items that exist on the mail client but no longer exist on the mail server (for example, if an email has been recalled).

Each such polling event results in a large amount of data transferring between the mail server and the mail client. Furthermore, each polling event requires small but significant computational resources from the mail server. Frequent polling is required to ensure a short delay between the time when the mail server receives new mail and the time when the mail client is aware of the arrival of new mail. However, frequent polling increases the traffic capacity requirement of the network, as well as the computational resource usage on the mail server.

On the mail server side, when new mail is received, it must first check the recipient address to identify whether the client has set up any sort of server-initiated-notification preference for new mail arrival. If so, then the mail server must configure the necessary notification message containing the relevant information about the new mail item and transmit it to the associated mail client. Upon receipt of this notification, the mail client initiates the necessary actions based on the information provided in the notification. Some of the possible actions may include, but are not limited to, downloading the new message, ignoring the new message, deleting the new message, and forwarding the new message. While this can provide near-instantaneous notification of new email, the establishment of an ongoing session between the mail server and the mail client consumes significant computing resources at the mail server. A server-initiated-notification message must be sent on the arrival of each and every new mail item. For users who receive frequent mailings, this can be a significant load on mail server resources.

Additionally, these techniques are an inefficient use of data communications resources for most e-mail users. Each data message transmitted incurs a fixed overhead within the data communications network. When each message only contains information about a single new mail item, the percentage overhead is significantly higher than if a single data message contains information about multiple new mail items. Furthermore, the user may not require the immediacy of server-initiated-notification at all times.

What is needed is a solution that allows the prompt notification of new mail arrival while minimizing unnecessary loading of mail server and network resources.

BRIEF DESCRIPTION OF THE INVENTION

A solution is provided that allows prompt notification of new e-mail arrival while minimizing the unnecessary loading of mail server and network resources. It provides a short time delay after arrival of new e-mail when the user needs it most, and minimizes the unnecessary loading of resources when the user does not require immediate notification. This is accomplished by establishing a session with the mail server once a predefined event, such as the sending of new e-mail, has occurred. This session may invoke server-initiated-notification of new-email for a limited period of time.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
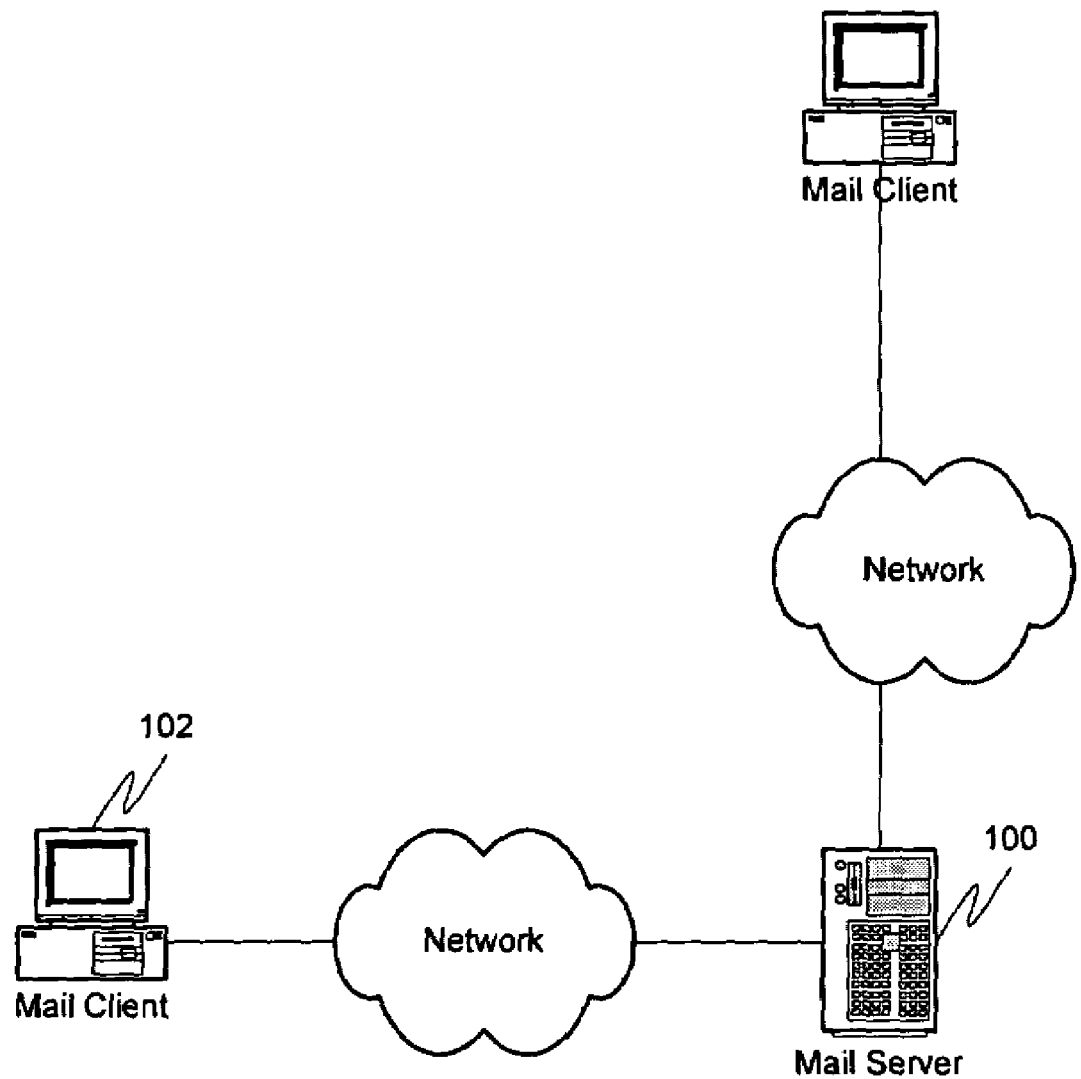
FIG. 1 is a diagram illustrating a typical mail server and mail client system.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The software may be stored on a program storage device readable by a machine.

The present invention provides a solution that allows prompt notification of new email arrival while minimizing the unnecessary loading of mail server and network resources. It provides a short time delay after arrival of new e-mail when the user needs it most, and minimizes the unnecessary loading of resources when the user does not require immediate notification.

In an embodiment of the present invention, the occurrence of specific events may infer that the e-mail user is particularly interested in immediate notification of new mail arrival. For example, in the wireless world, it is quickly becoming commonplace to immediately reply to emails, almost treating emails similarly to instant messages. It may be beneficial, therefore, to have the server immediately notify the user of new mail following this event. In one embodiment, the specific event may be the selection of a low latency notification option by a user. For example, before sending an email the user may select this option because he views it as an "important" e-mail. Likewise, the user may be able to simply select a low latency notification option at a moment's notice. This would allow a user who is expecting an email at 8 PM to activate the low latency notification option shortly before 8 PM. Alternatively, the event may be a calendar event where the user is likely to want immediate notification of messages, such as a birthday, or on New Year's Eve. Additionally, a geographic location may serve as an event as well. For example, many cellular phones will soon have built in Global Positioning Satellite (GPS) receivers to determine their location. The geographic location may serve as a trigger for altering the immediacy of new mail notification. For example, when the device is located at or near a user's home, the immediacy of new mail notification may not be as great as when the device is located at or near a user's work.

In another embodiment of the present invention, rather than the event triggering the immediate notification of new mail arrival or an increased polling frequency, the opposite may occur, wherein the event triggers a decrease in polling frequency or a "black out" period for new email arrival. For example, the user may wish to not receive email during the Super Bowl, or other important event.

In an embodiment of the present invention, if the mail server supports server-initiated-notification of new mail, the mail client may establish a session to the mail server to invoke this service for a limited period of time, for example, between 1 minute and 15 minutes, once one of these specific events have occurred. If the mail server does not support server-initiated-notification of new mail, the mail client may automatically increase the polling frequency for a limited period of time, for example, between 1 minute and 15 minutes. The polling frequency may increase to between once every 30 second to once every 2 minutes, for example.

In an embodiment of the present invention, a variable polling timer may be utilized. This may be helpful in the second case described above, where the mail server does not support server-initiated-notification of new mail. It may also be helpful in the general case, to improve efficiency of polling even in times where no specific event has occurred.

For example, the variable polling timer could be set to once every 15 minutes during normal operations, but at low usage times, such as at night or on weekends, the timer may be automatically set to a lower frequency, such as once every 4 hours.

In an embodiment of the present invention, the establishing of a session to the mail server to invoke server-initiated-notification of new mail is performed using the IMAP4 Idle command. This informs the server that the client is ready to accept unsolicited mailbox update messages. The server requests a response to the IDLE command using the continuation ("+") response. The IDLE command remains active until the client responds to the continuation, typically with a "DONE" command. That response satisfies the server's continuation request, and terminates the IDLE status. Therefore, in this embodiment of the present invention, when the limited period of time lapses (for example, 15 minutes), then the mail client may initiate a "DONE" command to terminate the IDLE status. It should be noted that the IMAP4 protocol allows a server to consider a client inactive if no command has been received from the client for a certain period of time. Therefore, it may be necessary in certain implementations to have the mail client terminate then immediately restart the IDLE status to avoid being involuntarily terminated. It should also be noted that the client may need to terminate the IDLE status early if other IMAP commands are to be executed, such as if the user wishes to retrieve the newly received mail.

In another embodiment of the present invention, when polling at different rates (in the situation where the server does not support server-initiated notification), it may be possible to forego logging out of an IMAP4 session between polls. This becomes possible if the polling rate is accelerated to a predefined threshold (e.g., less than a minute). This further increases bandwidth savings and improves server scalability by eliminating the need for IMAP4 session open/close overhead.

Furthermore, in another embodiment of the present invention, the request for server-initiated notification (e.g., the IMAP4 IDLE command) may be issued on a separate session as other IMAP4 commands. This allows for race conditions to be properly handled. Additionally, one more poll may be issued when the IDLE command is acknowledged to prevent the system from missing any events between the time of the poll and the time the IDLE command is started.

Figure 2:
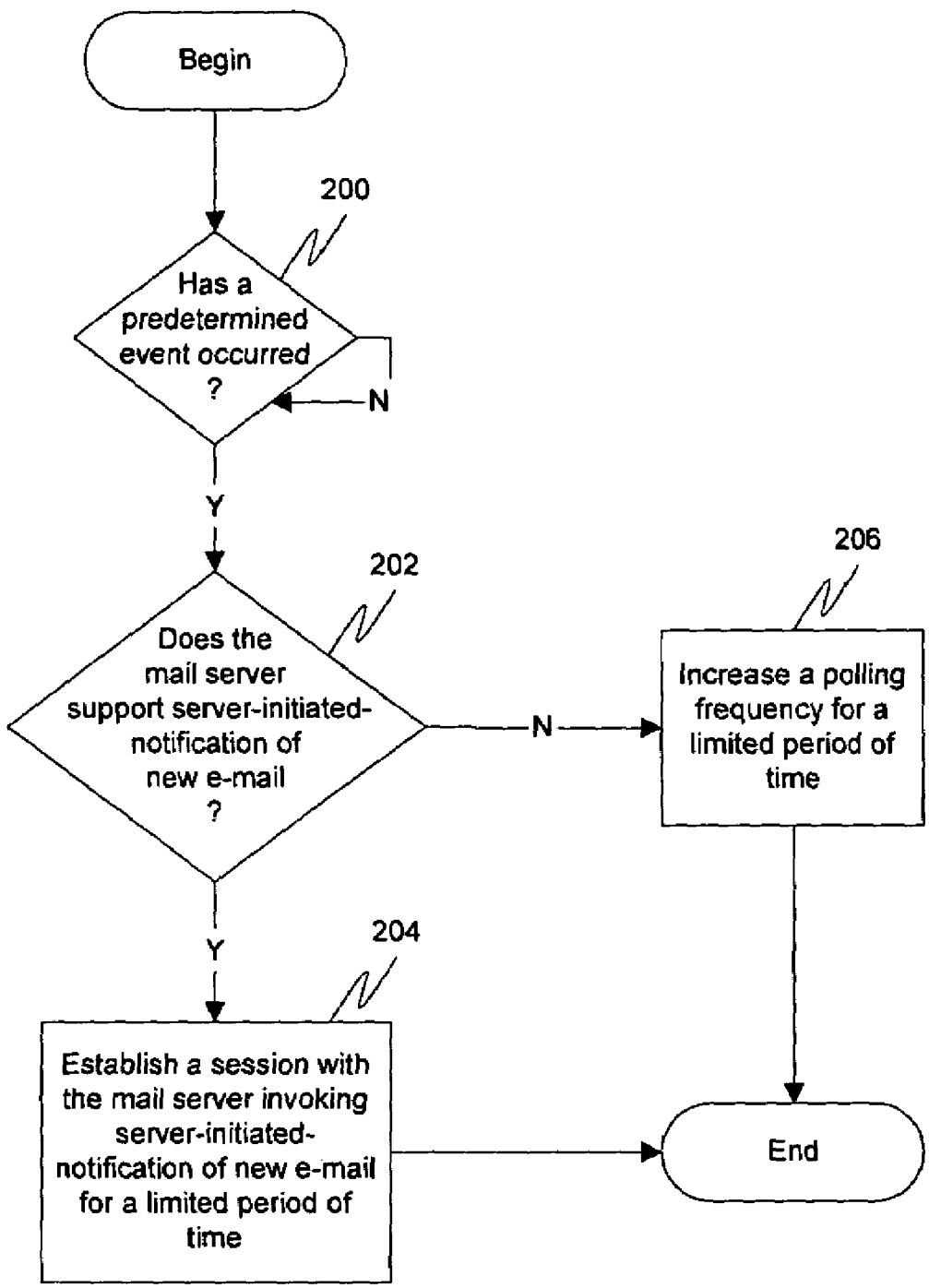
FIG. 2 is a flow diagram illustrating a method for efficiently receiving notification of new e-mail from a mail server in accordance with an embodiment of the present invention.

FIG. 2 is a flow diagram illustrating a method for efficiently receiving notification of new e-mail from a mail server in accordance with an embodiment of the present invention. At 200, it may be determined if a predefined event has occurred. The predefined event may be, for example, the sending of an email, the selection of a low latency notification option by a user, a calendar event, the passing of a time of day, a geographic event or some other event determined to require the immediate notification of response messages. If so, then at 202 it may be determined if the mail server supports server-initiated-notification of new e-mail. If so, then at 204 a session with the mail server may be established invoking server-initiated-notification of new e-mail for a limited period of time. The limited period of time may be, for example, between 1 and 15 minutes. Establishing the session may be accomplished in the IMAP4 protocol by sending an IMAP4 IDLE command to the mail server, and it may be terminated though the use of an IMAP DONE command. If server-initiated-notification of new e-mail is not supported, then at 206 a polling frequency may be increased for a limited period of time. This limited period of time may also be, for example, between 1 and 15 minutes.

Figure 3:
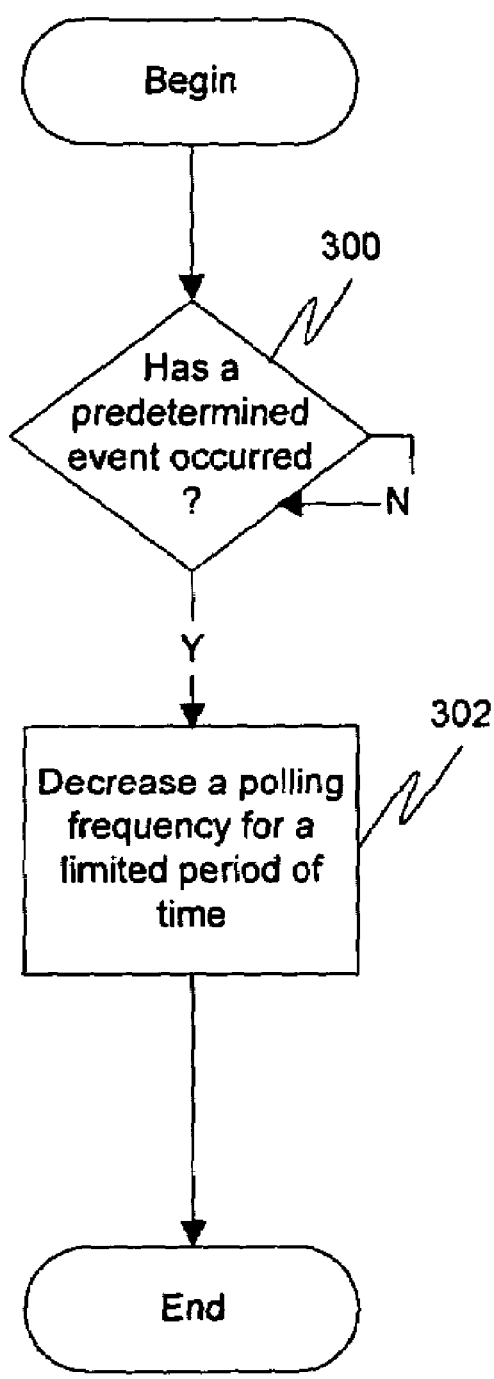
FIG. 3 is a flow diagram illustrating a method for efficiently receiving notification of new e-mail from a mail server in accordance with another embodiment of the present invention.

FIG. 3 is a flow diagram illustrating a method for efficiently receiving notification of new e-mail from a mail server in accordance with another embodiment of the present invention. At 300, it may be determined if a predefined event has occurred. The predefined event may be, for example, a calendar event, the passing of a time of day, a geographic event, or some other event determined to signify that low latency notification is not required. If such an event occurs, then at 302, a polling frequency may be changed for a limited period of time.

Figure 4:
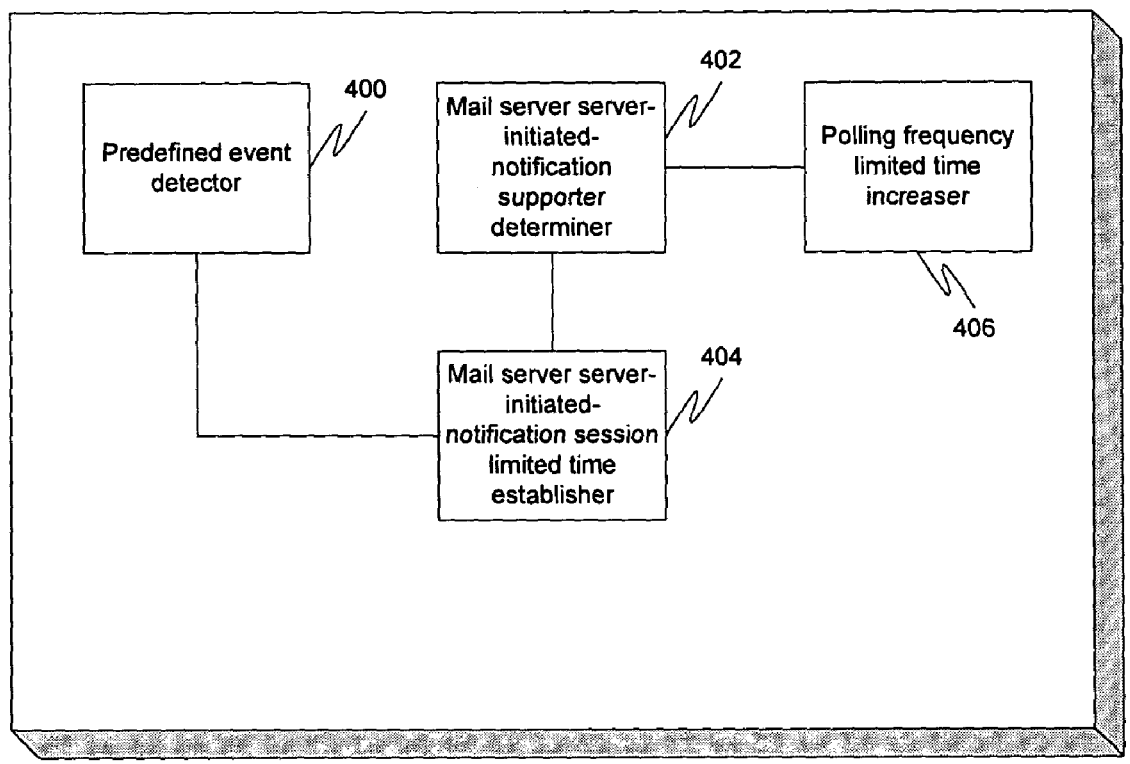
FIG. 4 is a block diagram illustrating an apparatus for efficiently receiving notification of new e-mail from a mail server in accordance with an embodiment of the present invention.

FIG. 4 is a block diagram illustrating an apparatus for efficiently receiving notification of new e-mail from a mail server in accordance with an embodiment of the present invention. A predefined event detector 400 may determine if a predefined event has occurred. The predefined event may be, for example, the sending of an email, the selection of a low latency notification option by a user, or some other event determined to require the immediate notification of response messages. If a predefined event has occurred, then a mail server server-initiated-notification supporter determiner 402 may determine if the mail server supports server-initiated-notification of new e-mail. If so, a mail server server-initiated-notification session limited time establisher 404 coupled to the predefined event detector 400 and to the mail server server-initiated-notification supporter determiner 402 may establish a session with the mail server invoking server-initiated-notification of new e-mail for a limited period of time. The limited period of time may be, for example, between 1 and 15 minutes. Establishing the session may be accomplished in the IMAP4 protocol by sending an IMAP4 IDLE command to the mail server, and it may be terminated though the use of an IMAP DONE command. If server-initiated-notification of new e-mail is not supported, then a polling frequency limited time increaser 406 coupled to the mail server server-initiated-notification supporter determiner 402 may increase a polling frequency for a limited period of time. This limited period of time may also be, for example, between 1 and 15 minutes.

Figure 5:
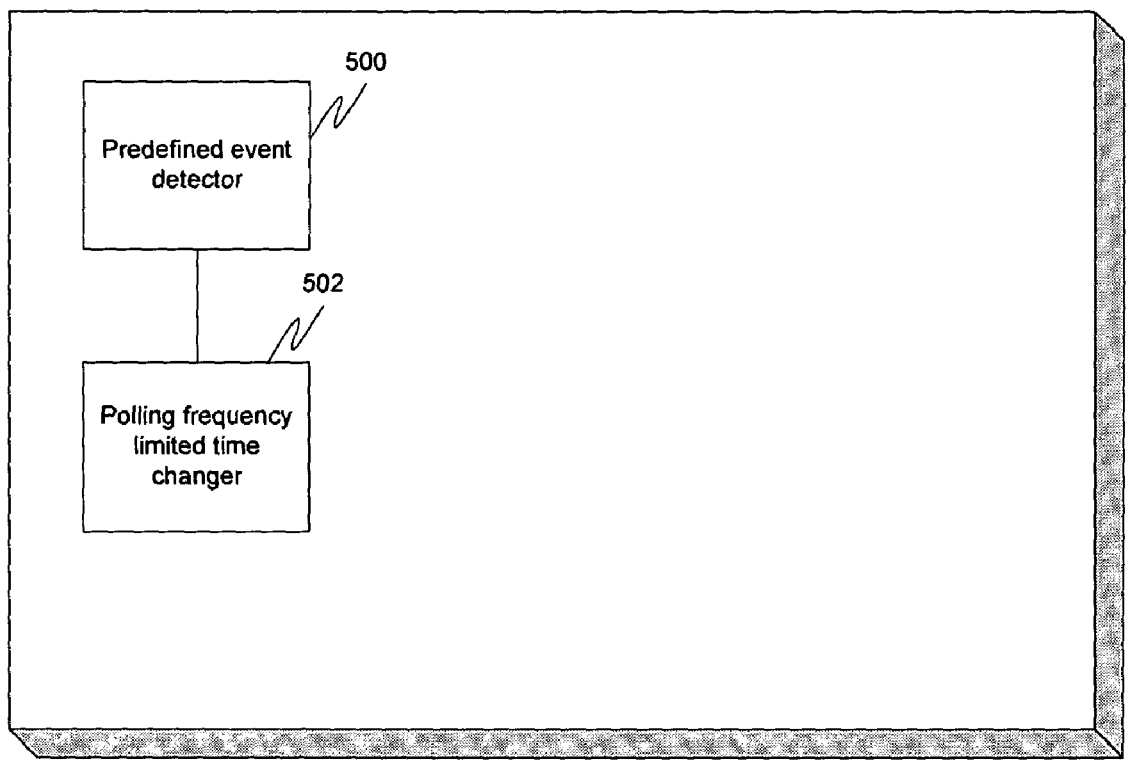
FIG. 5 is a block diagram illustrating an apparatus for efficiently receiving notification of new e-mail from a mail server in accordance with another embodiment of the present invention.

FIG. 5 is a block diagram illustrating an apparatus for efficiently receiving notification of new e-mail from a mail server in accordance with another embodiment of the present invention. A predefined event detector 500 may determine if a predefined event has occurred. The predefined event may be, for example, a calendar event, the passing of a time of day, a geographic event, or some other event determined to signify that low latency notification is not required. If such an event occurs, then a polling frequency limited time changer 502 coupled to the predefined event detector 500 may change a polling frequency for a limited period of time.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for efficiently receiving notification of new e-mail from a mail server, the method comprising:
   determining if a predefined event has occurred, the predefined event indicating a user's interest level in regard to immediate notification of receipt, by the mail server, of a new e-mail, notification occurring at a mail client;
   determining if the mail server supports server-initiated-notification of new e-mail;
   if the predefined event has occurred and the mail server does not support server-initiated notification of new e-mail, automatically modifying a polling frequency for a limited period of time; and
   if the predefined event has occurred and the mail server supports server-initiated notification of new e-mail, automatically establishing a session with the mail server invoking server-initiated-notification of new e-mail for a limited period of time.

2. The method of claim 1, wherein the sending of an e-mail is a predefined event.

3. The method of claim 1, wherein the selection of a low latency notification option by a user is a predefined event.

4. The method of claim 1, wherein the predefined event is a calendar event.

5. The method of claim 1, wherein the predefined event is the passing of a time of day.

6. The method of claim 1, wherein the predefined event is a geographic event.

7. The method of claim 1, wherein the limited period of time is between 1 and 15 minutes.

8. The method of claim 1, wherein the establishing includes sending an IMAP4 IDLE command to the mail server.

9. The method of claim 8, further comprising sending an IMAP4 DONE command to the mail server after the limited period of time.

10. The method of claim 8, further comprising sending an IMAP4 DONE command to the mail server if the user needs to execute a different IMAP4 command.

11. The method of claim 1, further comprising:
   terminating the session after a limited period of time.

12. An apparatus for efficiently receiving notification of new e-mail from a mail server, the apparatus comprising:
   a predefined event detector configured to determine if a predefined event has occurred, the predefined event indicating a user's interest level in regard to immediate notification of receipt, by the mail server, of a new e-mail, notification occurring at a mail client;

a mail server-initiated notification supporter determiner configured to determine if the mail server supports user-initiated-notification of new e-mail;

a polling frequency limited time changer configured to, if the predefined event has occurred and the mail server does not support server-initiated notification of new e-mail, automatically modify a polling frequency for a limited period of time; and a mail server server-initiated-notification session limited time establisher coupled to the predefined event detector and the mail server-initiated notification supporter determiner and configured to, if the predefined event has occurred and the mail server supports server-initiated notification of new e-mail, automatically establish a session with the mail server invoking server-initiated-notification of new e-mail for a limited period of time.

13. The apparatus of claim 12, wherein the predefined event is a calendar event.

14. The apparatus of claim 12, wherein the predefined event is the passing of a time of day.

15. The apparatus of claim 12, wherein the predefined event is a geographic event.

16. An apparatus for efficiently receiving notification of new e-mail from a mail server, the apparatus comprising:

means for determining if a predefined event has occurred, the predefined event indicating a user's interest level in regard to immediate notification of receipt, by the mail server, of a new e-mail, notification occurring at a mail client;

means for determining if the mail server supports server-initiated-notification of new e-mail;

means for, if the predefined event has occurred and the mail server does not support server- initiated notification of new e-mail, automatically modifying a polling frequency for a limited period of time; and means for, if the predefined event has occurred and the mail server supports server-initiated notification of new e-mail, automatically establishing a session with the mail server invoking server-initiated-notification of new e-mail for a limited period of time.

17. The apparatus of claim 16, wherein the sending of an e-mail is a predefined event.

18. The apparatus of claim 16, wherein the selection of a low latency notification option by a user is a predefined event.

19. The apparatus of claim 16, wherein the predefined event is a calendar event.

20. The apparatus of claim 16, wherein the predefined event is the passing of a time of day.

21. The apparatus of claim 16, wherein the predefined event is a geographic event.

22. The apparatus of claim 16, wherein the limited period of time is between 1 and 15 minutes.

23. The apparatus of claim 16, wherein the means for establishing includes means for sending an IMAP4 IDLE command to the mail server.

24. The apparatus of claim 23, further comprising means for sending an IMAP4 DONE command to the mail server after the limited period of time.

25. The apparatus of claim 24, further comprising:

means for terminating the session after a limited period of time.

26. The apparatus of claim 23, further comprising means for sending an IMAP4 DONE command to the mail server if the user needs to execute a different IMAP4 command.

27. A program storage device readable by a machine, tangibly embodying a program of instructions executable by the machine to perform a method for efficiently receiving notification of new e-mail from a mail server, the method comprising:

determining if a predefined event has occurred, the predefined event indicating a user's interest level in regard to immediate notification of receipt, by the mail server, of a new e-mail, notification occurring at a mail client;

determining if the mail server supports server-initiated-notification of new e-mail;

if the predefined event has occurred and the mail server does not support server-initiated notification of new e-mail, automatically modifying a polling frequency for a limited period of time; and if the predefined event has occurred and the mail server supports server-initiated notification of new e-mail, automatically establishing a session with the mail server invoking server-initiated-notification of new e-mail for a limited period of time.

* * * * *

UNITED STATES PATENT AND TRADEMARK OFFICE
CERTIFICATE OF CORRECTION

PATENT NO. : 7,624,147 B2 Page 1 of 1
APPLICATION NO. : 10/655679
DATED : November 24, 2009
INVENTOR(S) : Tosey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 968 days.

Signed and Sealed this

Twenty-sixth Day of October, 2010

David J. Kappos
*Director of the United States Patent and Trademark Office*